United States Patent [19]

Elmer

[11] Patent Number: 4,772,305

[45] Date of Patent: Sep. 20, 1988

[54] PROCESS FOR DEWATERING POROUS GLASS

[75] Inventor: Thomas H. Elmer, Corning, N.Y.

[73] Assignee: Corning Glass Works, Corning, N.Y.

[21] Appl. No.: 880,458

[22] Filed: Jun. 30, 1986

[51] Int. Cl.$^4$ ............................................. C03C 23/00
[52] U.S. Cl. ......................................... 65/30.1; 65/32; 65/900
[58] Field of Search ................. 65/30.1, 900, 32, 18.2, 65/18.1

[56] References Cited

U.S. PATENT DOCUMENTS

| | | | |
|---|---|---|---|
| 2,106,744 | 2/1938 | Hood et al. | 65/33 |
| 2,315,329 | 3/1943 | Hood et al. | 65/33 |
| 3,775,078 | 11/1973 | Elmer et al. | 65/32 |
| 3,826,560 | 7/1974 | Schultz | 65/30.1 |
| 4,105,427 | 8/1978 | Elmer | 65/32 |
| 4,203,744 | 5/1980 | Schultz et al. | 65/30.1 |

FOREIGN PATENT DOCUMENTS 822868 11/1959 United Kingdom ................. 65/900

Primary Examiner—Kenneth M. Schor
Attorney, Agent, or Firm—Clinton S. Janes, Jr.

[57] ABSTRACT

There is disclosed a method of dewatering porous 96% silica glass by impregnating the glass pores with an aqueous solution of a water-soluble, nitrogen-containing, organic compound that is thermally decomposable to produce reactive gaseous nitrogen species, and then thermally decomposing the impregnating compound to yield nitrogen which combines with the glass to oust hydroxyl group. A preferred material is guanidine hydrochloride, and a non-oxidizing atmosphere is maintained during heating to avoid nitrogen oxidation. The nitrided porous glass may subsequently be thermally consolidated to a non-porous body.

7 Claims, No Drawings

PROCESS FOR DEWATERING POROUS GLASS

BACKGROUND OF THE INVENTION

The present invention relates to the treatment of glasses known in the art as 96% silica glasses, and particularly to the treatment of such glasses to modify the physical properties thereof by removing hydroxyl ions therefrom and introducing nitrogen.

Glasses of the kind referred to as 96% silica glasses, and methods for manufacturing such glasses, are described in U.S. Pat. No. 2,106,744 to Hood et al. In accordance with such methods, alkali borosilicate glasses of specified composition are subjected to a phase separation heat treatment to separate the glass into a silica-rich phase and a phase rich in alkali and boron. This latter phase is then removed by leaching to provide a microporous glass body comprising a very high percentage of silica (typically at least about 94% by weight) and minor amounts of residual alkali and boron.

Glass produced by this process is referred to as 96% silica glass without regard to the exact silica content thereof. It may be used either in the porous state, or, after consolidation by heating, in the non-porous state. In porous form, the glass may be used to support catalysts and enzymes, and as a chromatographic medium. Consolidated 96% silica glass is used to provide refractory glass articles such as crucibles and envelopes for arc lamps.

It is also known that glasses generally can include hydroxyl species such as, for example, silanol groups (—Si—OH). These can result from the presence of hydroxides or water in batch materials, or from moisture otherwise introduced during glass processing. Such species not only reduce the annealing point of the glass but also give rise to infrared absorption bands therein.

PRIOR LITERATURE

A number of United States patents teach methods for treating porous 96% silica glass to modify certain glass properties.

U.S. Pat. No. 2,982,053 (Elmer) teaches displacing OH radicals by permeating the porous glass with a fluorine-containing fluid. This may be a solution of ammonium fluoride or bifluoride, and it is suggested that fluoride ions replace hydroxyl ions in the porous glass.

U.S. Pat. No. 3,113,008 (Elmer) describes increasing the annealing point of a 96% silica glass by heating the glass in a porous state in an atmosphere containing ammonia, the temperature being in the range of 900° to 1050° C., and thereafter consolidating in a non-oxidizing atmosphere. The ammonia is said to provide nascent nitrogen which reacts with the glass. U.S. Pat. No. 3,159,946 (Elmer) adds consolidation in an oxidizing atmosphere to the ammonia treating step in order to raise infra red transmittance.

U.S. Pat. No. 3,459,522 (Elmer et al) discloses removing residual water from a porous glass by treatment in a flowing stream containing chlorine, the chloride ions replacing hydroxyl ions in the porous glass.

U.S. Pat. No. 4,105,427 (Elmer) describes a process for dewatering porous glass by contacting the glass with water vapor at an elevated temperature below the glass annealing point, and then further heating at a higher temperature in a dry atmosphere prior to consolidating. U.S. Pat. No. 4,116,657 enhances the annealing point of a 96% silica glass by depositing a carbon film on the porous glass walls, heating in a non-oxidizing atmosphere at about 1000° C. to remove water and then in an oxidizing atmosphere to remove the carbon.

PURPOSES OF THE INVENTION

Vacuum firing is inconvenient, while dry air treatments are not as effective in reducing the concentration of hydroxyl species as might be desired. Chloride and fluoride dehydroxylating agents introduce halogen ions into the glass which, unless properly controlled, act as fluxes to reduce the annealing point thereof.

For some operations, the previously proposed ammonia treatment is undesirable, thus creating a need for an effective, alternative, dewatering and nitriding process.

It is a principal object of the present invention to provide a convenient process for dewatering porous glass through the removal of hydroxyl species therefrom which is quite effective in increasing the annealing point and reducing the infrared absorption of the glass.

It is a further object to provide a method of introducing nitrogen ions which does not involve a flowing ammonia-containing atmosphere.

It is another object to provide a process of dewatering porous glass which produces consistent properties through the thickness of a porous glass body.

Other objects and advantages of the invention will become evident from the following description.

SUMMARY OF THE INVENTION

The invention is largely based on my discovery that removal of hydroxyl ions to dewater porous 96% silica glass can be accomplished by impregnating the glass with a water-soluble, nitrogen-containing, organic compound that is thermally decomposable to produce reactive gaseous nitrogen species. I have further found that this nitrogen from the impregnating compound combines with the glass to impart a nitrogen component to the glass composition. This substantially increases the annealing point of the glass.

Based on these discoveries, my invention is a process for dewatering porous 96% silica glass which comprises:

a. impregnating the porous glass with an aqueous solution of a water soluble, nitrogen-containing organic compound that is thermally decomposable to produce reactive gaseous nitrogen species.

b. heating the impregnated porous glass to dissociate nitrogen from the organic compound, combine the nitrogen with the glass, and expel hydroxyl ion from the glass, and optionally, c. further heating the glass to consolidate it to a non-porous condition.

GENERAL DESCRIPTION

The composition of porous 96% silica glass to be treated in accordance with the invention is not critical, although it is a factor which affects the annealing point and thus the range of processing temperatures most useful for treatment. The silica content of 96% silica glass may range from as low as 94% to as high as 97% or more by weight, but is typically about 96%–97%. The boron content of such glass is normally within the range of about 2%–5%. The annealing temperature of consolidated 96% silica glass varies somewhat with composition, but usually falls in the range of 950°–1050° C.

The organic compound employed as an impregnant must be a nitrogen-containing compound that will thermally dissociate to yield reactive nitrogen, and by-products that are dissipated as by burning off or vaporizing. Such nitriding organic compounds include amine compounds and their salts, preferably a guanidine salt or urea. As demonstrated later, guanidine hydrochloride is a preferred material. Presumably, its effectiveness stems from the formation of chlorine species that are further effective in hydrogen removal.

Infrared spectroscopy and chemical analysis show that porous glass bodies treated in accordance with the present invention contain appreciable amounts of nitrogen. This leads me to conclude that the present action and effects correspond to those previously believed to be unique to ammonia gas treatment of porous glass. Thus, I believe the organic compound yields nascent nitrogen as it dissociates under influence of heat. This nitrogen then occupies sites formerly occupied by oxygens and/or hydroxyl groups, the latter being expelled from the glass. The nitriding action is further described and depicted in the literature, for example in an article entitled "Glass Surfaces" which I contributed to a book entitled "Silylated Surfaces", edited by Leyden and Collins and published by Gordon & Breach Science Publishers (1980). See pages 1-29, in particular pages 24-29.

To facilitate complete impregnation, aqueous solutions of the organic impregnant are used. Normally, immersion of the porous glass body in the impregnating solution is a convenient mode of operation. It has been found that impregnation with materials in accordance with the present invention assures nitriding, and consequent property change, over the entire thickness of a glass body.

It is apparent that decomposition of the impregnant and dissipation of unwanted portions should occur well before pore closure is initiated. Accordingly, it is desirable that such phase be completed below about 900° C. Experience has shown that the critical nitrogen species are sensitive to oxidation. Therefore, the thermal treatment is carried out in a non-oxidizing atmosphere, preferably a nitrogen atmosphere.

Consolidation of the dewatered porous glass is accomplished by heating in the known manner. Use of a consolidation step following the removal of hydroxyl groups is customary since a non-porous glass product is usually required. Conveniently, consolidation is accomplished immediately subsequent to the dehydroxylating step by merely raising the temperature of the porous glass above the consolidation temperature after sufficient hydroxyl removal has been achieved. Significant consolidation of dehydroxylated glass typically commences at about 1050° C., with final consolidation temperatures in the 1200°-1300° C. range being used to insure that consolidation is complete.

The extent of dehydroxylation obtained in any particular case may be determined by comparing the infrared absorption characteristics of treated and untreated glass. Both types of glass exhibit absorption bands in the infrared due to the presence of —OH groups therein, but the absorption of treated glass is significantly reduced. Quantitative comparisons are based on the relative height of the absorption peak at 2.73 μm wavelength in the infrared. The so-called $\beta_{OH}$ value associated with this peak, which is a measure of peak height, is defined as follows:

$$\beta_{OH} = 1/t \, \log_{10}(T_{2.6}/T_{2.73})$$

wherein
t = sample thickness in millimeters
$T_{2.6}$ = sample transmittance in percent at 2.6 μm
$T_{2.73}$ = sample transmittance in percent at 2.73 μm (the OH absorption peak)

The $\beta_{OH}$ value of treated glass, computed from the above equation, is typically substantially lower than the $\beta_{OH}$ value of untreated glass of the same basic composition.

To the extent that hydrogen develops, and is not adequately removed, amide (—NH) development in the pores may occur, and may cause reversal of the desired dewatering. Hydrogen removal can be insured by flushing with a chlorine-containing atmosphere. It is believed that use of guanidine hydrochloride automatically provides this action by producing chlorine as it decomposes.

SPECIFIC DESCRIPTION

Tests were conducted on a porous glass produced by acid leaching an alkali borosilicate glass after that glass had been phase separated at 575° C. into a silica-rich phase and a borate-rich phase. The phase separated glass was leached in nitric acid to remove the soluble, borate-rich phase and leave a porous, silica-rich glass body. The latter was washed, dried, and prefired at 900° C. in air. The composition of the porous glass, on the basis of its ignited weight, was approximately 96% $SiO_2$, 3% $B_2O_3$, 0.4% $R_2O_3 + RO_2$ (chiefly $Al_2O_3$ and $ZrO_2$), and traces of $Na_2O$.

Test samples included both tubing and small plates of the porous glass. Tubing samples were 5 cm. long and 1.24 cm. O.D., and had a 1.14 mm. wall. The flat plates were 7.7×2.5 cm. and 4 to 5 mm. thick.

Three different nitrogen-containing materials were used for impregnatiion purposes. Aqueous solutions were produced by dissolving urea, guanidine hydrochloride, and guanidine carbonate, separately, in distilled water. Porous glass samples were immersed in the solutions and allowed to soak for several hours. The impregnated samples were then dried either in air or with mild heating. This was followed by heating to about 900° C. to dissociate the nitrogen compound and permit reaction with the glass. Following this, the samples were heated to 1225° C. and held at that temperature for 30 minutes to consolidate the porous glass to a non-porous glass body of corresponding form. The consolidated bodies were then cooled to room temperature.

Each sample was then examined to determine its infrared transmittance characteristics. Beta OH ($\beta_{OH}$) values were calculated as described earlier. TABLE I below sets forth the form of each sample, the impregnant (if any), the approximate thickness of each sample (in mm.), and the calculated $\beta_{OH}$ value in $mm^{-1}$.

TABLE I

| Form | Impregnant | Thickness (mm) | $B_{OH}(mm^{-1})$ |
| --- | --- | --- | --- |
| Plate | Urea | 4 | 0.04 |
| Plate | None | 4 | 0.29 |
| Tube | Guanidine-HCl | 1 | 0.00 |
| Tube | None | 1 | 0.31 |
| Tube | Guanidine-CO₃ | 1 | 0.05 |
| Tube | None | 1 | 0.34 |

It is readily apparent that the glasses treated with an organic nitriding agent, that is a compound capable of yielding reactive nitrogen, have dramatically reduced water contents.

Further development of the invention is reported with respect to tests performed with each of the three exemplary nitrogen-containing impregnating compounds independently.

UREA

Aqueous urea solutions were prepared by dissolving urea in distilled water in a ratio of 25 grams urea to 22.5 mls. water. Test samples were impregnated at 23° C. for times ranging from one to 16 hours. The samples were removed, dried in air or electric oven, and then fired to dissociate the impregnated urea.

The samples were fired in accordance with conventional consolidation practice, that is 100°/hr. from 110° C. to 1225° C. and then held ½ hour. Infra-red measurements showed little or no effect relative to a blank. It is surmised that the impregnant was volatilized, or otherwise dissipated, before any reaction could be effected.

Samples were then essentially flash fired by heating in accordance with this schedule.

75° to 160° C. in 2 hours
hold 5 minutes at 450° C.
place in quartz tube at 700° C.
700° to 1225° C. in 4½ hours
hold at 1225° C. for ½ hour TABLE II shows the $\beta_{OH}$ values noted on impregnated samples and blanks fired coincident therewith.

| Sample | $\beta_{OH}(mm^{-1})$ |
|---|---|
| Sample 7 | 0.098 |
| Blank | 0.354 |
| Sample 8 | 0.075 |
| Blank | 0.168 |

All samples were fired in a nitrogen atmosphere to avoid oxidation of the reactive nitrogen.

In a further set of tests, porous glass bodies, impregnated as above, were allowed to dry gradually in air, rather than being introduced directly into an oven. This is necessary with thicker articles, such as plates, to avoid breakage. The dry test pieces were then fired on the accelerated schedule and in a stream of nitrogen. Blanks were fired with each for comparison. Sample 9 was a 1 mm. wall porous tube impregnated for 16 hours in a 50 gram/45 ml. aqueous solution of urea. Sample 10 was a 4.2 mm. thick plate impregnated for 7 hours. TABLE III records the $\beta_{OH}$ data for the samples and corresponding blanks:

TABLE III

| Sample | $\beta_{OH}(mm^{-1})$ |
|---|---|
| 9 | 0.044 |
| Blank | 0.167 |
| 10 | 0.042 |
| Blank | 0.303 |

GUANIDINE-HCL

Impregnating solutions were prepared by dissolving this material in distilled water to provide concentrations in percent by weight varying from 20 to 60%. Porous tubing and plates, as described above, were soaked in these solutions for several hours, removed and dried, and fired on these schedules in a nitrogen atmosphere.

| Tubing (1 mm) | Plate (4.2 mm) |
|---|---|
| 22–180° C. 3½ hr. | at 65° overnite |
| 230° C. ½ hr. | 60–180° C. 50° C./hr. |
| 230–1225° C. 100° C./hr. | 180–1225° C. 100° C./hr. |
| at 1225° C. ½ hr. | at 1225° C. ½ hr. |

$\beta_{OH}$ values were calculated from infra-red measurements on a Perkin-Elmer Model 221 IR Spectrophotometer.

These values are shown in TABLE IV.

| Sample | Thickness (mm) | Concentration (wt. %) | $\beta_{OH}(mm^{-1})$ |
|---|---|---|---|
| 11 | 1.0 | 20 | 0.249 |
| 12 | 1.0 | 30 | 0.234 |
| 13 | 1.0 | 40 | 0.028 |
| 14 | 1.0 | 50 | 0.008 |
| 15 | 1.0 | 60 | 0.004 |
| 16 | 1.0 | Blank | 0.248 |
| 17 | 4.2 | 20 | 0.302 |
| 18 | 4.2 | 30 | 0.065 |
| 19 | 4.2 | 40 | 0.000 |
| 20 | 4.2 | 50 | 0.000 |
| 21 | 4.2 | 60 | 0.000 |
| 22 | 4.2 | Blank | 0.346 |

Several additional samples were prepared with an impregnating solution containing about 65.6 wt.% guanidine hydrochloride. These samples, after firing, were analyzed for nitrogen content and had viscosity measurements made at $10^{13}$ and $10^{13.2}$ poises, values in the vicinity of the annealing point for the glass. TABLE V shows the values determined.

| Sample | $10^{13}$poise | $10^{13.2}$poise | $\beta_{OH}$ (mm$^{-1}$) | N$_2$ (wt. %) |
|---|---|---|---|---|
| Tubing | 1131 | 1118 | 0.036 | — |
| Tubing | 1081 | 1067 | 0.000 | 0.71 |
| Tubing | 1007 | 992 | 0.266 | — |
| Plate | — | — | 0.000 | 0.87 |
| Plate | — | — | 0.000 | 1.13 |

The third tubing sample was a blank, thus indicating the substantial increase in annealing temperature attainable. Blank or untreated samples are, of course, essentially free of nitrogen.

GUANIDINE CARBONATE

Several impregnating solutions, varying from 20% to 50% by weight guanidine carbonate, were prepared by dissolving the carbonate in distilled water. Porous tubes and plates were then soaked in these solutions, as before, for times ranging from one to 3½ hours. The 20% and 30% solutions were warmed to hasten solution, but were used at ambient. The 50% and 50% solutions tended to separate, and were used at 95° C. to avoid this problem. Impregnation was complete in one hour at 95° C., whereas 3½ hours were employed at ambient.

Test pieces of impregnated tubing (0.1 mm wall) and plates (4.2 mm thick) were fired in a nitrogen atmosphere in accordance with these schedules:

| Tubing | Plates |
|---|---|
| 23–180° C. 100° C./hr. | 23–140° C. 35° C./hr. |
| 180–950° C. 160° C./hr. | 200–800° C. 160° C./hr. |
| 950–1225° C. 100° C./hr. | 880–1225° C. 50° C./hr. |

-continued

| Tubing | Plates |
|---|---|
| at 1225° C. ½ hr. | at 1225° C. ½ hr. |

$\beta_{OH}$ values were calculated from infra-red measurements as before, and are recorded in TABLE VI for tubing samples 23–26, blanks 27 and 31, and plate samples 28–30.

TABLE VI

| Sample | Concentration (%) | $\beta_{OH}(mm^{-1})$ |
|---|---|---|
| 23 | 20% | 0.057 |
| 24 | 30 | 0.049 |
| 25 | 40 | 0.339 |
| 26 | 50 | 0.885 |
| 27 | Blank | 0.260 |
| 28 | 20 | 0.144 |
| 29 | 30 | 0.044 |
| 30 | 40 | 0.062 |
| 31 | Blank | 0.262 |

It is apparent that the dewatering effect is reversed in thin wall tubing at higher impregnant concentrations, but not in the thicker plates. It is believed this anomalous behavior is related to decomposition products, in particular hydrogen from =NH groups in the porous structure, reacting with the glass.

I claim:

1. A process for dewatering porous 96% silica glass which comprises:

a. impregnating the porous glass with an aqueous solution of a water soluble, nitrogen-containing, organic compound that is thermally decomposable to produce reactive nitrogen species which chemically combine with the glass to impart a nitrogen component to the glass composition;

b. drying the impregnated porous glass to remove the water of the aqueous solution; and c. heating the dried impregnated porous glass in a non-oxidizing atmosphere at a temperature below which pore closure is initiated to dissociate nitrogen from the organic compound, chemically combine the nitrogen with the glass whereby the nitrogen replaces hydroxyl ion, and expel hydroxyl ion from the glass.

2. The process of claim 1 which comprises further treating the glass with a chlorine-containing atmosphere.

3. The process of claim 1 which comprises further heating the porous glass containing nitrogen combined therewith to a higher temperature in a non-oxidizing atmosphere to consolidate it to a non-porous condition.

4. A process in accordance with claim 1 wherein the nitrogen-containing organic compound is an amine.

5. A process in accordance with claim 4 wherein the amine is a salt of guanidine.

6. A process in accordance with claim 5 wherein the guanidine salt is the hydrochloride.

7. A process in accordance with claim 1 wherein the nitrogen-containing organic compound is urea.

* * * * *